United States Patent
Browne et al.

(10) Patent No.: US 7,200,902 B2
(45) Date of Patent: *Apr. 10, 2007

(54) RELEASABLE FASTENER SYSTEM

(75) Inventors: Alan Lampe Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/273,691

(22) Filed: Oct. 19, 2002

(65) Prior Publication Data

US 2004/0074060 A1  Apr. 22, 2004

(51) Int. Cl.
A44B 18/00 (2006.01)
(52) U.S. Cl. .......................................... 24/442; 24/445
(58) Field of Classification Search ................. 24/442, 24/446, 451, 452, 450, 448, 304; 428/100
See application file for complete search history.

(56) References Cited

U.S. PATENT DOCUMENTS

| | | | | |
|---|---|---|---|---|
| 2,717,437 | A * | 9/1955 | Mestral | 428/92 |
| 2,994,117 | A * | 8/1961 | McMullin | 24/585.1 |
| 3,176,364 | A | 4/1965 | Dritz | |
| 3,469,289 | A * | 9/1969 | Whitacre | 24/450 |
| 3,490,107 | A * | 1/1970 | Brumlik | 24/451 |
| 3,808,648 | A * | 5/1974 | Billarant et al. | 24/450 |
| 4,169,303 | A * | 10/1979 | Lemelson | 24/452 |
| 5,071,363 | A | 12/1991 | Reylek et al. | |
| 5,212,855 | A | 5/1993 | McGanty | |
| 5,611,122 | A | 3/1997 | Torigoe et al. | |
| 5,657,516 | A | 8/1997 | Berg et al. | |
| 5,669,120 | A * | 9/1997 | Wessels et al. | 24/446 |
| 5,725,928 | A | 3/1998 | Kenney et al. | 428/100 |
| 5,798,188 | A | 8/1998 | Mukohyama et al. | |
| 5,945,193 | A * | 8/1999 | Pollard et al. | 428/100 |
| 6,086,599 | A | 7/2000 | Lee et al. | 606/108 |
| 6,454,923 | B1 | 9/2002 | Dodgson et al. | |
| 6,511,508 | B1 * | 1/2003 | Shahinpoor et al. | 623/4.1 |
| 6,544,245 | B2 * | 4/2003 | Neeb et al. | 24/442 |
| 6,546,602 | B1 * | 4/2003 | Eipper et al. | 24/442 |
| 6,598,274 | B1 * | 7/2003 | Marmaropoulos | 24/451 |

(Continued)

FOREIGN PATENT DOCUMENTS

WO   97/20480   6/1997

(Continued)

Primary Examiner—Jack W. Lavinder
(74) Attorney, Agent, or Firm—Kathryn A. Marra

(57) ABSTRACT

A releasable fastener system comprises a loop portion and a hook portion. The loop portion includes a support and a loop material disposed on one side thereof whereas the hook portion includes a support and a plurality of closely spaced upstanding hook elements extending from one side thereof. When the hook portion and loop portion are pressed together they interlock to form a releasable engagement. The resulting joint created by the engagement is relatively resistant to shear and pull forces and weak in peel strength forces. The hook elements are formed of a material or have configurations that provide a shape changing capability and/or change in flexural modulus property to the hook elements. In this manner, the shape and/or flexural modulus of the hook elements can be remotely changed to provide a reduction in the shear and/or pull-off forces.

16 Claims, 4 Drawing Sheets

U.S. PATENT DOCUMENTS

| | | | |
|---|---|---|---|
| 6,781,284 B1 * | 8/2004 | Pelrine et al. | 310/330 |
| 2002/0007884 A1 | 1/2002 | Schuster et al. | |
| 2002/0050045 A1 | 5/2002 | Chiodo et al. | |
| 2004/0033336 A1 * | 2/2004 | Schulte | 428/100 |

FOREIGN PATENT DOCUMENTS

| | | |
|---|---|---|
| WO | WO 01/84002 | 8/2001 |
| WO | WO0245536 A2 * | 6/2002 |
| WO | 03/085273 | 10/2003 |

* cited by examiner

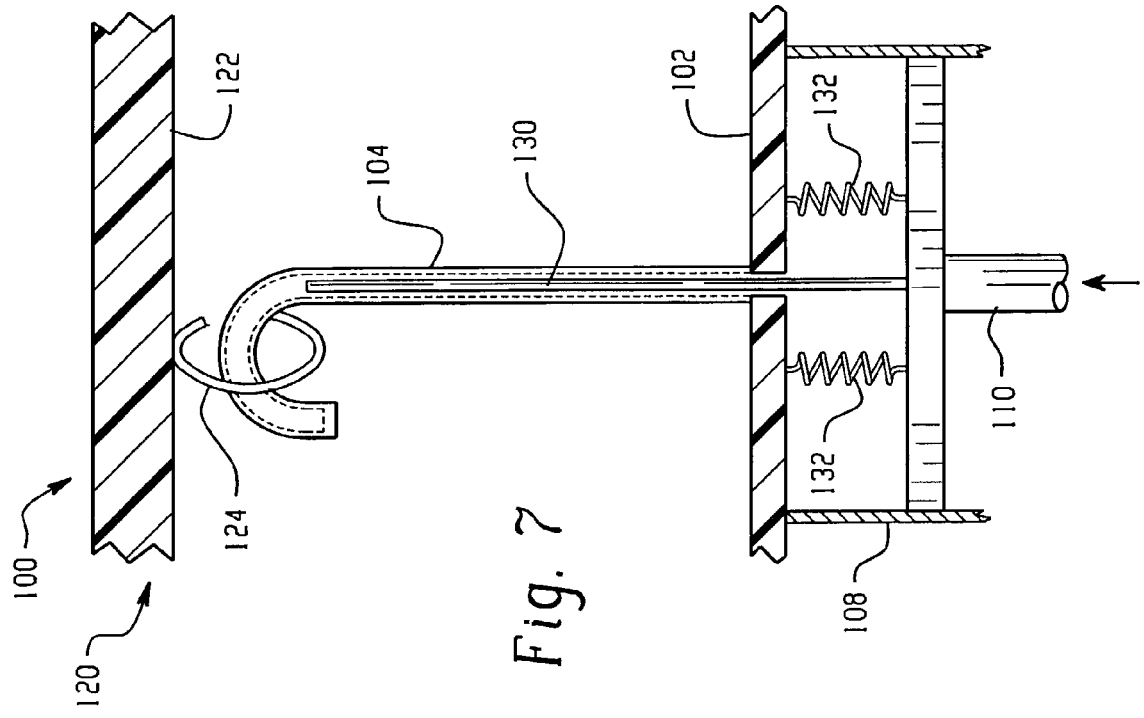
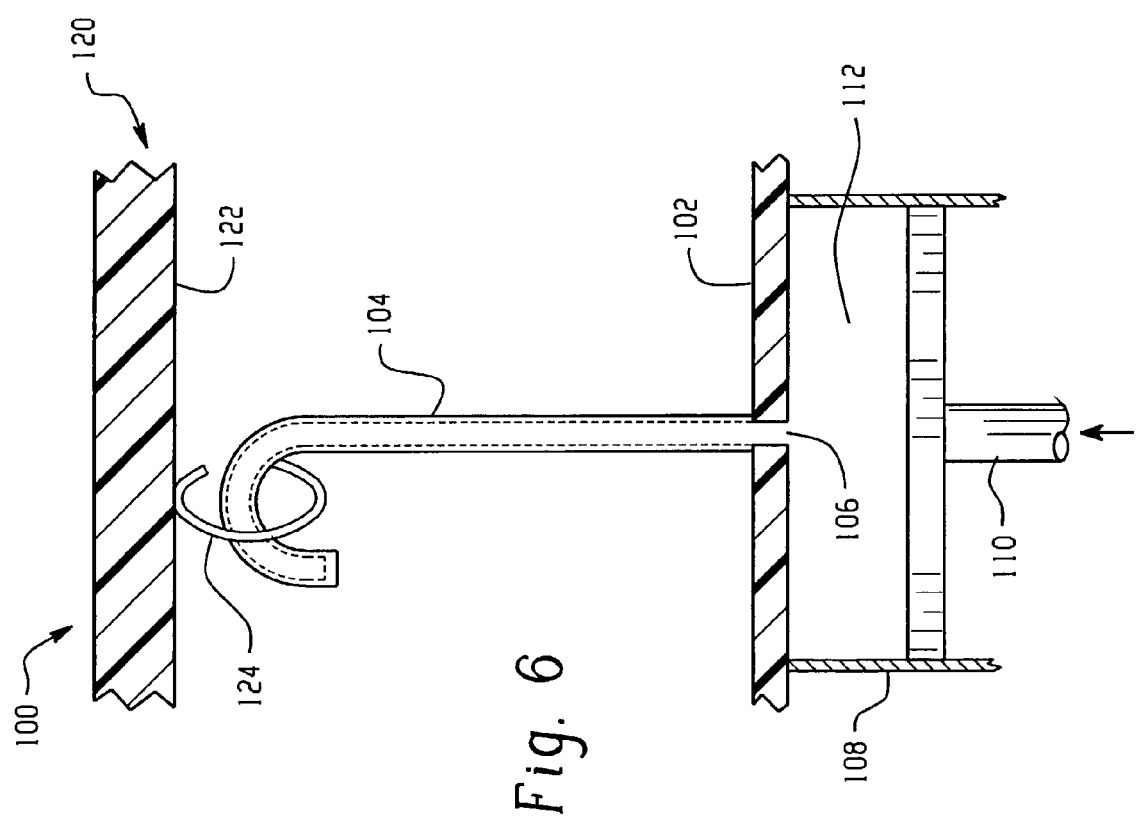

RELEASABLE FASTENER SYSTEM

BACKGROUND

This disclosure relates to releasable attachment devices of the type used to fasten, retain, or latch together components of an apparatus or a structure that are to be separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to move relative to each other in a direction perpendicular to their plane of contact.

BRIEF SUMMARY

Disclosed herein is a releasable fastener system that provides for a controlled release or separation of a joint in a shear and/or pull-off direction. The releasable fastener system comprises a loop portion comprising a support and a loop material disposed on a surface thereon; a hook portion comprising a support and a plurality of hook elements disposed on a surface, wherein the plurality of hook elements comprises a material adapted to change a shape orientation, a flexural modulus property, or a combination thereof, upon receipt of an activation signal; and an activation device coupled to the plurality of hook elements, the activation device being operable to selectively provide the activation signal to the hook elements and change the shape orientation, the flexural modulus property, or a combination of the shape orientation and flexural modulus properties upon demand to reduce a shear force and a pull-off force.

In one embodiment, a releasable fastener system comprises a loop portion comprising a support and a loop material disposed on a surface thereon; a hook portion comprising a support and a plurality of hook elements disposed on a surface, wherein the plurality of hook elements comprises a material or configuration adapted to change a shape orientation, a flexural modulus property, or a combination thereof; and means for changing the shape orientation, the flexural modulus property, or the combination thereof of the hook elements to reduce a shear force and/or a pull-off force of an engaged hook and loop portion.

A process for operating a releasable fastener system comprises pressing a loop portion to a hook portion to form a releasable engagement, wherein the loop portion comprises a support and a loop material disposed on a surface thereon, and wherein the hook portion comprises a support and a plurality of hook elements disposed on a surface, wherein the plurality of hook elements comprises a material or a configuration adapted to change a shape orientation, a flexural modulus property, or a combination thereof, upon receipt of an activation signal; maintaining constant shear and pull-off forces in the releasable engagement without introducing an energy signal; selectively introducing the energy signal to the hook elements, wherein the energy signal is effective to change a shape orientation, a flexural modulus property, or the combination thereof to the plurality of hook elements; and reducing shear and pull off forces in the releasable engagement.

In one embodiment, a process for operating a releasable fastener system comprises contacting a hook portion in a powered state to a loop portion, wherein the loop portion comprises a support and a loop material disposed on a surface thereon, and wherein the hook portion comprises a support and a plurality of hook elements disposed on a surface, wherein the loop material and the plurality of hook elements comprises a material or a configuration adapted to change a shape orientation, a flexural modulus property, or a combination thereof, during the powered state; and turning off the power, wherein the hook elements and the loop material interlock to form a releasable engagement.

A hook portion for a releasable fastener system comprises a support; and a plurality of hook elements disposed on a surface of the support, wherein the plurality of hook elements comprise a material or configuration adapted to change a shape orientation, a flexural modulus property, or a combination thereof, upon receipt of an activation signal.

The above described and other features are exemplified by the following figures and detailed description.

BRIEF DESCRIPTION OF THE DRAWINGS

Referring now to the figures, which are exemplary embodiments and wherein the like elements are numbered alike:

FIG. 6 is a cross sectional view of a pneumatic releasable fastener system; and

FIG. 7 is a cross sectional view of a mechanically activated releasable fastener system.

DETAILED DESCRIPTION

Figure 1:
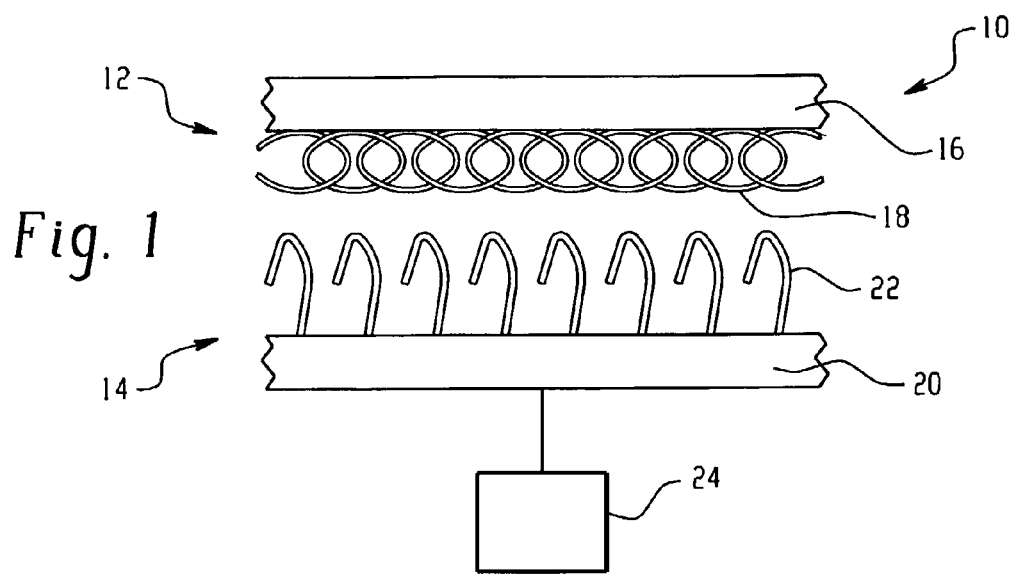
FIG. 1 is a cross sectional view of a releasable fastening system.

As shown in FIG. 1, a releasable fastener system, generally indicated as 10, comprises a loop portion 12 and a hook portion 14. The loop portion 12 includes a support 16 and a loop material 18 disposed on one side thereof whereas the hook portion 14 includes a support 20 and a plurality of closely spaced upstanding hook elements 22 extending from one side thereof. The hook elements 22 are formed of a material or have configurations that provide a shape changing capability and/or a change in flexural modulus properties to the hook elements 22 as will be described in greater detail. Preferably, the materials employed are resilient and flexible in addition to providing shape changing capabilities and/or changes in the flexural modulus properties. Coupled to and in operative communication with the hook elements 22 is an activation device 24. The activation device 24, on demand, provides an activation signal to the hook elements 22 to change the shape orientation and/or flexural modulus of the hook element 22. The activation signal provided by activation device 24 for changing the shape orientation and/or flexural modulus of the hook elements 22 may include a heat signal, a magnetic signal, an electrical signal, a pneumatic signal, a mechanical activation signal, combinations comprising at least one of the foregoing signals and the like, the particular activation signal depending on the materials and/or configuration of the hook elements 22. The change in shape orientation and/or flexural modulus property generally remains for the duration of the applied activation signal. Upon discontinuation of the activation signal, the hook elements 22 revert substantially to a relaxed or unpowered shape. The illustrated releasable fastener system 10 is exemplary only and is not intended to be limited to any particular shape, size, configuration, number or shape of hook elements 22, shape of loop material 18, or the like.

During engagement, the two portions 12, 14 are pressed together to create a joint that is relatively strong in shear and pull-off directions, and weak in a peel direction. For example, when the two portions 12, 14 are pressed into face-to-face engagement, the hook elements 22 become engaged with the loop material 18 and the close spacing of the hook elements 22 resists substantial lateral movement when subjected to shearing forces in the plane of engagement. Similarly, when the engaged joint is subjected to a force perpendicular to this plane, (i.e., pull-off forces), the hook elements 22 resist substantial separation of the two portions 12, 14. However, when the hook elements 22 are subjected to a peeling force, the hook elements 22 can become disengaged from the loop material 18. It should be noted that separating the two portions 12, 14 using the peeling force generally requires that one or both of the supports forming the hook portion and loop portion be flexible.

Figure 2:
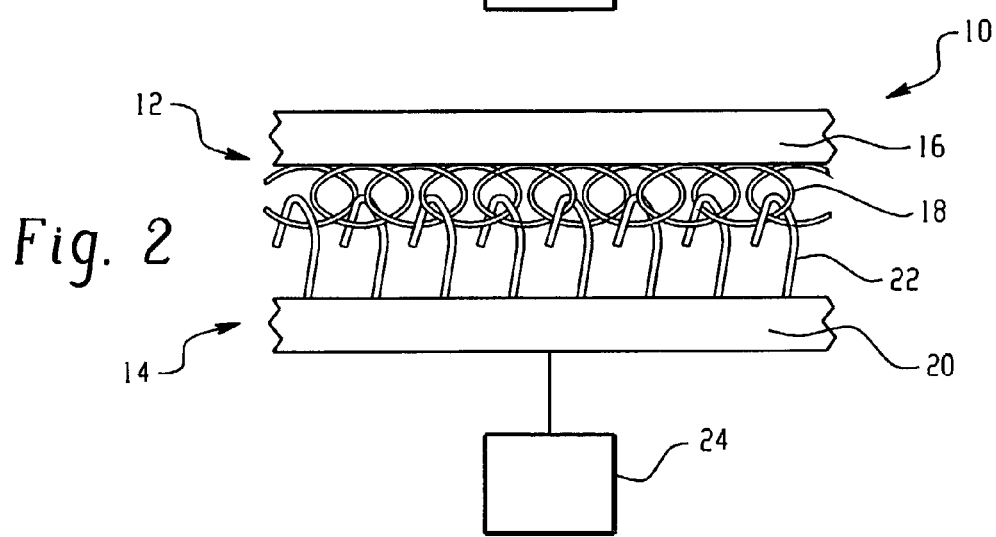
FIG. 2 is a cross sectional view of the releasable fastening system of FIG. 1, wherein the releasable fastening system is engaged.
Figure 3:
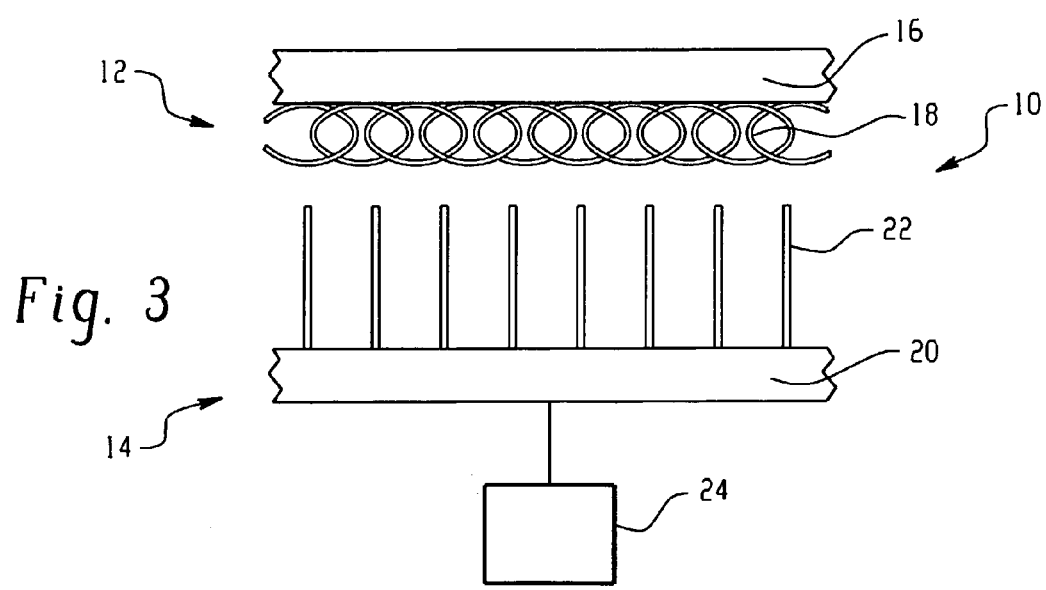
FIG. 3 is a cross sectional view of the releasable fastening system of FIG. 1, wherein the releasable fastening system is disengaged.

To reduce shear and pull-off forces resulting from the engagement, the shape orientation and/or flexural modulus of the hook elements 22 is altered upon receipt of the activation signal from the activation device 24 to provide a remote releasing mechanism of the engaged joint. As a result of changing the shape orientation and/or flexural modulus of the hook elements 22, a marked reduction in shear and pull off forces is observed, thereby allowing the joint to separate in directions normally associated with pull-off and shear. That is, the change in shape orientation and/or flexural modulus reduces the shearing forces in the plane of engagement, and reduces the pull off forces perpendicular to the plane of engagement. For example, as shown in FIGS. 2 and 3, the plurality of hook elements 22 can have inverted J-shaped orientations that are changed, upon demand, to substantially straightened shape orientations upon receiving an activation signal from the activation device 24. The substantially straightened shape relative to the J-shaped orientation provides the joint with marked reductions in shear and pull-off forces. Similarly, a reduction in shear and pull off forces can be observed by changing the flexural modulus of the hook elements. The change in flexural modulus properties can be made individually, or in combination with the shape change. For example, changing the flexural modulus properties of the hook elements to provide an increase in flexibility will reduce the shear and pull-off forces. Conversely, changing the flexural modulus properties of the hook elements to decrease flexibility (i.e., increase stiffness) can be used to increase the shear and pull-off forces when engaged. That is, the holding force is increased thereby providing a stronger joint.

The hook elements 22 may be formed integrally with support 20, or more preferably, may be disposed on the support 20. In practice, spacing between adjacent hook elements 22 is an amount effective to provide sufficient shear and pull off resistance desired for the particular application during engagement with the loop material 18. Depending on the desired application, the amount of shear and pull-off force required for effective engagement can vary significantly. Generally, the closer the spacing and the greater amount of hook elements employed will result in increased shear and pull off forces upon engagement. The hook elements 22 preferably have a shape configured to become engaged with the loop material 18 upon pressing contact of the loop portion 12 with the hook portion 14, and vice versa. In this engaged mode, the hook elements 22 can have an inverted J-shaped orientation, a mushroom shape, a knob shape, a multi-tined anchor, T-shape, spirals, or any other mechanical form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a key and lock type engagement), or any other mechanical form of a loop-like element used for separable hook and loop fasteners.

In one embodiment, the materials chosen for fabricating the hook elements 22 are used to provide the shape changing capability and/or change in flexural modulus. Suitable materials for providing the shape changing capability and/or change in flexural modulus include, but are not limited to, shape memory alloys, shape memory polymers, piezoelectrics, magnetostrictive materials (also referred to as magnetorestrictive materials), ionic polymer metal composites, elastic memory composites, electroactive polymers and metal composites, and the like materials. The activation device 24 can be configured to deliver an activation signal to the hook elements, wherein the activation signal may comprise a magnetic signal, an electrical signal, a heat signal, a pneumatic signal, a mechanical activation signal, a combination comprising at least one of the foregoing signals, and the like, wherein the type of activation signal employed is dependent on the particular shape changing material and/or flexural modulus changing material employed for fabricating the hook element. For example, a magnetic and/or and electrical signal could be employed for changing the shape of hook elements fabricated from magnetostrictive materials. Heat signals could be employed for causing a shape change in hook elements fabricated from shape memory alloys or shape memory polymers. Electrical signals could be employed for causing a shape change in hook elements fabricated from electroactive materials, piezoelectrics, electrostatics, and ionic polymer metal composite materials.

The loop material 18 generally comprises a random looped pattern or pile of a material. The loop material is often referred to as the "soft", the "fuzzy", the "pile", the "female", or the "carpet". Suitable loop materials are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 18 may be integrated with the support or may be attached to the support.

Alternatively, the loop material 18 can be fabricated from the same shape changing and/or flexural modulus changing materials employed for the hook elements. As such, instead of being passive, the loop material can be made active upon receipt of an activation signal. For example, both the hook elements and the loop material can be in the form of spirals, which when pressed together result in an engagement relatively strong in shear and pull-off forces and weak in peel forces. Activating the loop material 18 and hook elements 22 causes a change in shape and/or flexural modulus, thereby providing a marked reduction in shear and pull-off forces required for separation.

The supports 16 (loop portion 12) or 20 (hook portion 14) may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or loop material) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16, 20 could be fabricated from a rigid or inflexible material in view of the remote releasing capability provided. Traditional hook and loop fasteners typically require at least one support to be flexible so that a peeling force can be applied for separation of the hook and loop fastener.

The support 20 may also comprise the activation device 24 for providing the activating signal to the hook elements. For example, the support may be a resistance type heating block to provide a thermal energy signal sufficient to cause a shape change and/or change in flexural modulus such as may be required for hook elements fabricated from shape memory alloys, shape memory polymers, and like thermally activated materials, or the support 20 may be an electromagnet for providing a magnetic signal to hook elements fabricated from magnetostrictive materials, or the support 20 may be composed of a circuit for delivering an electrical signal to hook elements fabricated from electroactive materials, ionic polymer metal composites, electrostatic materials, piezoelectric materials, and the like. In a similar manner, if the loop material 18 is fabricated from the same materials as the hook elements 22, then support 16 may also comprise the activation device 24 for providing the activating signal to the loop material 18.

For exemplary purposes, reference will now be made to the use of shape memory alloys for fabrication of the hook elements and for providing a change in shape orientation capability and/or a change in flexural modulus properties upon receiving an activation signal. The changes in shape orientation and/or flexural modulus properties can be effected by employing the shape memory property and/or super-elasticity property of the particular shape memory alloy. For example, shape memory alloys generally have the ability to return to a predetermined shape when heated to a temperature at or above a transformation temperature. When a shape memory alloy is below its transformation temperature, the alloy has very low yield strength and can be deformed quite easily into any new shape. However, when the material is heated above its transformation temperature the shape memory alloy undergoes a change in crystal structure that causes it to return to its original shape. The temperature at which the alloy remembers its high temperature form when heated can be adjusted by slight changes in the composition of the alloy and through heat treatment. In nickel titanium (NiTi) shape memory alloys, for instance, it can be changed from above about 100° C. to below about −100° C. The shape recovery process occurs over a range of just a few degrees and the start or finish of the transformation can be controlled to within a degree or two depending on the desired application.

The two phases that occur in shape memory alloys are often referred to as martensite and austenite phases. The martensite phase is a relatively soft and easily deformable phase of the shape memory alloys, which generally exists at lower temperatures. The austenite phase, the stronger phase of shape memory alloys, occurs at higher temperatures.

In one embodiment, the hook portion comprises a surface that contains an array of hook elements fabricated from the shape memory alloy. The so-formed hook elements are perpendicularly oriented to the surface and have a hook-like shape orientation. The loop material comprises a surface that contains loops or piles of material. Alternatively, as previously discussed, the loop material can be fabricated from shape memory alloys configured with a similar geometry and function to those on the hook portion to which the loop material surface is to be attached, e.g., both hook elements and loop materials may comprises spiral shaped geometries that can become engaged when the two portions are pressed together. The arrays of hook elements of various geometries and/or loops on the two surfaces are to be so arranged and sufficiently dense such that the action of pressing the two surfaces together results in the mechanical engagement of the hook elements with the loop material creating a joint that is strong in shear and pull-off forces, and relatively weak in peel. Remote disengagement of the two surfaces is effected variously by raising the temperature of the shape memory alloy above its transformation temperature causing the hook elements and/or loop material to straighten (e.g. in those examples in which the shape memory property of the shape memory alloy is employed), and/or by lowering the temperature of the shape memory alloy to effect a switch from the stiffer austenite to the weaker martensite phase (e.g. in those examples in which the super-elasticity property of shape memory alloys is employed). In this manner, changing the shape orientation and/or flexural modulus properties of the hook elements can be used to provide on-demand remote engagement and disengagement of joints/attachments.

Optionally, the shape memory alloy hook elements can be coated with an elastomer, shape memory polymer, or the like, at a thickness effective to permit reversible strains up to about 20 to about 30%. In this manner, the coating increases the flexural modulus of the hook elements in the unpowered state, and therefore, its hold force, at low temperatures.

In another embodiment, the super-elastic shape memory alloys are used to fabricate the hook elements. Super-elastic shape memory alloys exist in the stiff austenite phase at room temperature but transforms to the weaker martensite phase at lower temperatures. Lowering the temperature of the super-elastic shape memory alloy causes the shape memory alloy material to transform from the stiffer austenite to the weaker martensite phase permitting the separation of the two surfaces at significantly lower force levels. In this embodiment, the austenite phase is utilized to achieve the hold condition whereas cooling is employed to achieve release.

Figure 4:
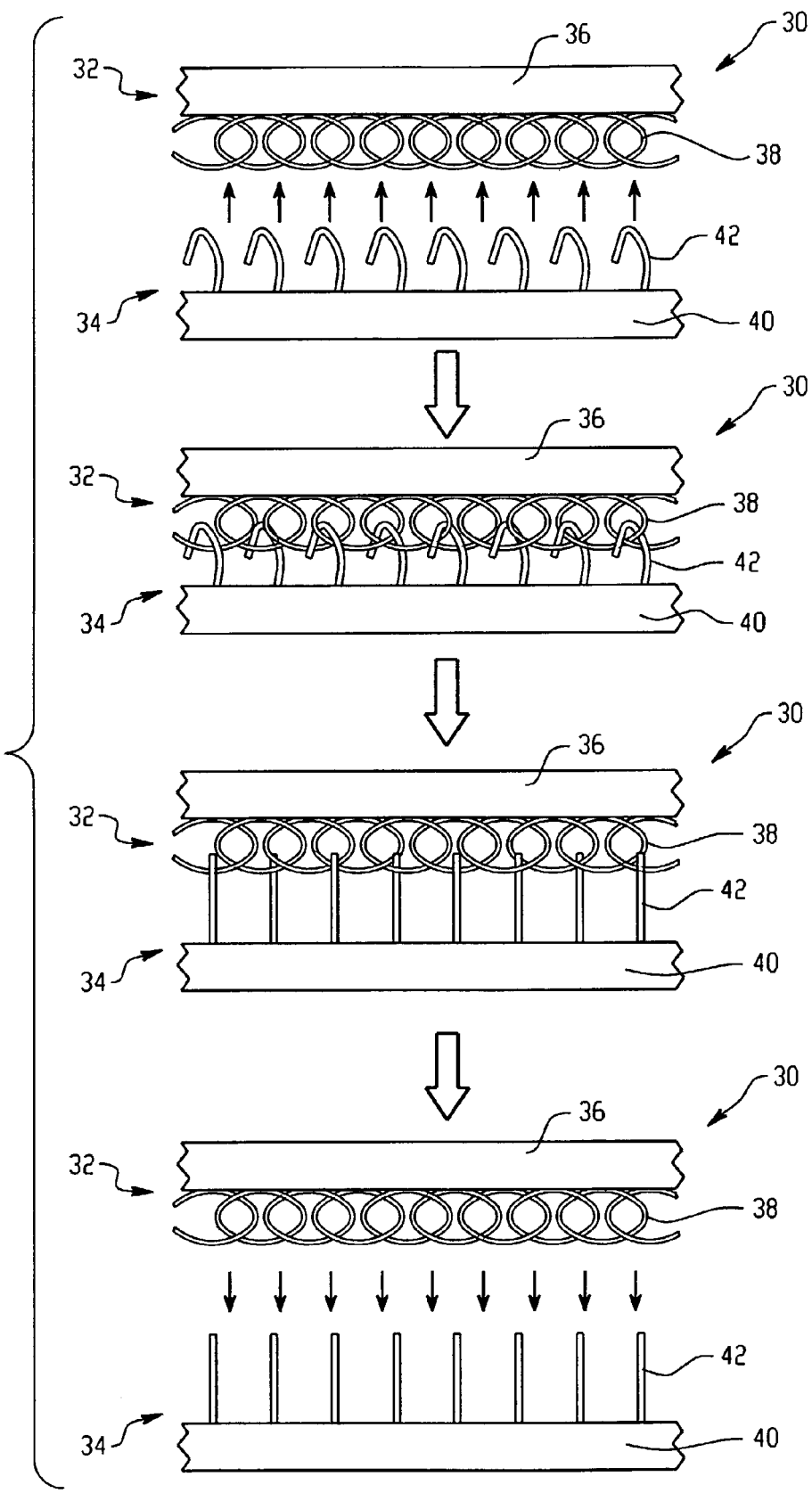
FIG. 4 is a cross sectional view of a releasable fastener system employing shape memory alloy materials.

FIG. 4 schematically illustrates a releasable fastener system employing shape memory alloys. The system, generally designated 30, comprises a loop portion 32 and a hook portion 34. The loop portion 32 includes a support 36 and a loop material 38 disposed on one side thereof whereas the hook portion 34 includes a support 40 and a plurality of closely spaced upstanding hook elements 42 extending from one side thereof. The two portions 30, 32 are pressed together to provide mechanical engagement. In an unpowered state, the engagement of the two portions 30, 32 results in a joint that is relatively resistant to shear and pull-off forces and weak in peel forces. In a powered state, an activation signal heats the hook elements 42 above the shape memory alloy's transformation temperature to cause the hook elements 42 to straighten as shown. Suitable activation signals include conduction of heat from the support surface to which the hook elements 42 are attached, resistance heating of the shape memory alloys hook elements themselves, general increases in temperature of the entire assembly and its environment (i.e., convection), combinations comprising at least one of the foregoing, or the like. Advantageously, maintaining engagement in the unpowered state provides a significant commercial advantage since energy resources are not employed to continuously maintain the engagement. It is only in the powered state that energy is required to provide the remote release of the two portions.

Figure 5A:
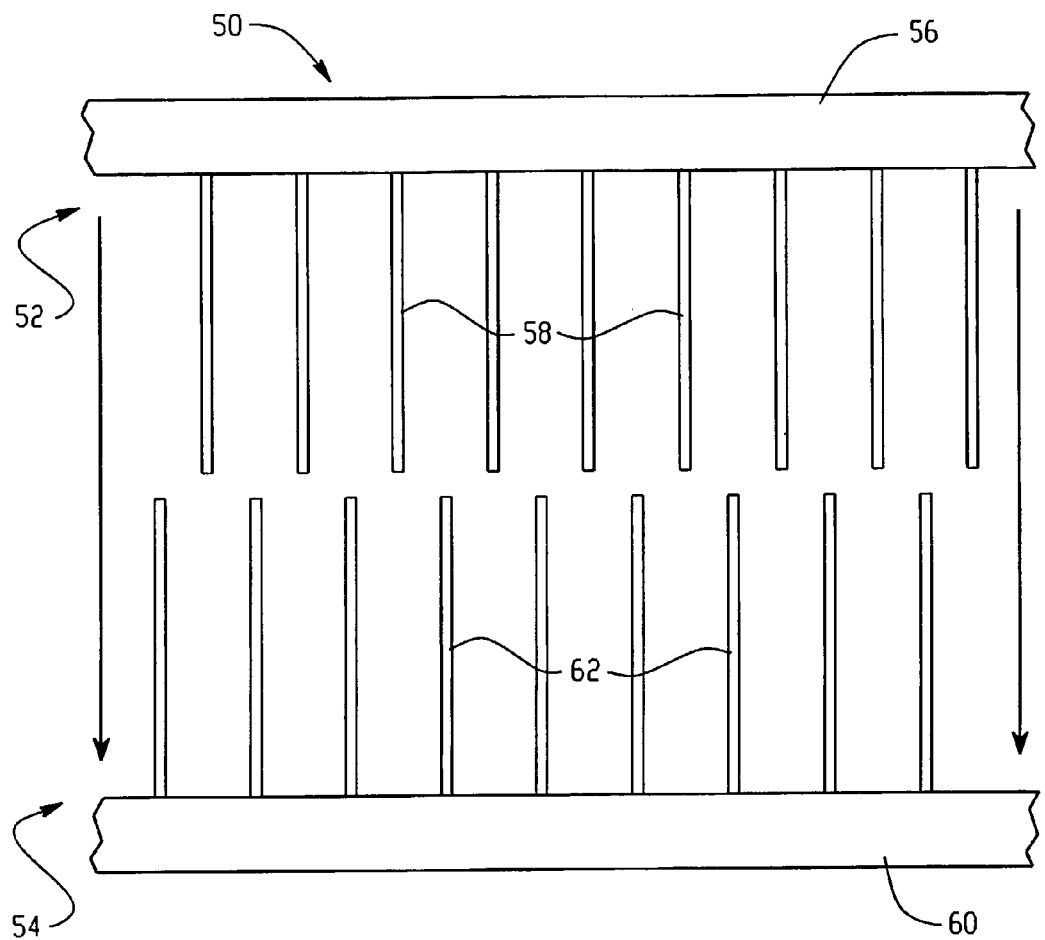
FIG. 5 is a cross sectional view of a releasable fastener system in accordance with another embodiment.
Figure 5B:
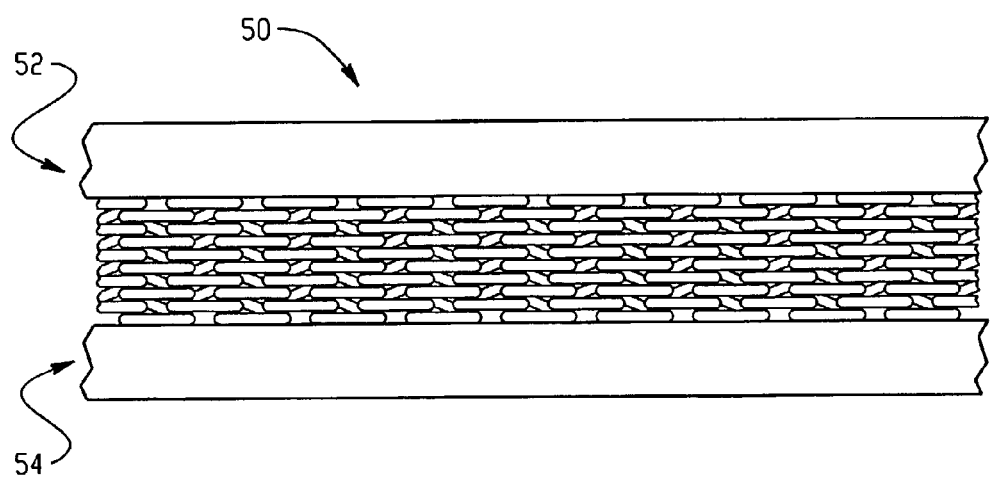

FIG. 5 schematically illustrates a releasable fastener system 50 comprising a loop portion 52 and a hook portion 54. The loop portion 52 includes a support 56 and a loop material 58 disposed on one side thereof whereas the hook portion 54 includes a support 60 and hook elements 62. In this embodiment, both the hook elements 52 and the loop material 54 are fabricated from a shape memory alloy and are in the form of spirals when in an unpowered state whereas in the powered state the shape of the spirals change to a relatively straightened shape as shown. In the powered state, both two portions 52, 54 are pressed together. The power is then turned off, i.e., activation signal is discontinued, and the loop material and the hook elements revert to the spiral shape orientation. As a result of the reversion to the spiral shape orientation, the spirals become interlocked, thereby providing a joint relatively resistant to shear and pull off forces, and weak in peel. To separate the two portions 52, 54, an activation signal is provided to the loop material 58 and the hook elements 62 in the manner previously described. Advantageously, once the joint is formed, no energy is expended to maintain the joint.

Suitable shape memory alloy materials include, but are not intended to be limited to, nickel titanium based alloys, copper based alloys (e.g., copper-zinc alloys, copper-aluminum alloys, and copper-tin alloys), gold cadmium alloys, iron-platinum alloys, and the like. The hook elements can be formed from the shape memory alloy by first forming wires or fibers. Stresses can then be introduced to the wires and fibers formed of these alloys by surface treatments such as, for example, high energy beams from ion or laser sources or mechanical means from shot peening or polishing. These treatments can alter the structure of the regions near the surface and introduce stresses that cause the formation of hooks. The fibers can then be placed on a substrate (e.g., support 20) by a variety of methods. For example, an adhesive can be applied (e.g., silver-doped epoxy) to the substrate and the shape memory alloy hook elements can be mechanically pressed into the adhesive.

In an alternative embodiment, the shape changing capability of the hook element can be provided pneumatically and/or by mechanical means. For example, the hook elements can be fabricated in the form of hollow tubes. In this embodiment, the activation device comprises an air inflation mechanism, which can selectively pressurize and/or depressurize the hollow tubes. In this manner, the hollow tube, i.e., hollow elements, may be straightened or relaxed upon demand to provide a remote releasable fastening system.

FIG. 6 schematically illustrates an exemplary pneumatically actuated releasable fastener system. The pneumatically actuated releasable fastener system, generally designated 100, comprises a support 102 having a plurality of upright hook elements 104 and perforations 106. Each hook element 104 comprises a hollow interior region aligned with and in fluid communication with the perforation 106 in the support 102. In a relaxed or unpowered state, the hook elements 104 are hook-like shaped and can become engaged with a loop portion 120. The loop portion 120 comprises a support 122 and a loop material 124 on one side thereof. For simplicity, FIG. 6 illustrates a single loop 124 and hook element 104 in an engaged position. In practice, a plurality of hook elements 104 and loops 124 are preferably employed. The hook elements 104 are fabricated from resilient flexible materials to permit flexing and unflexing of the hook elements 104.

The system 100 further comprises a containment vessel 108 coupled to the support 102 in which a plunger 110 can be slidably engaged against the walls of the containment vessel 108. Inward movement of the plunger 110 causes pressurization of air within a reservoir 112 formed in the containment vessel 108, which subsequently causes pressurization of air within the hook element 104. The increase of pressure within the hook element 104 will cause a change in the shape orientation and/or flexural modulus of the hook element 104. More particularly, the hook element 104 will straighten, thereby disengaging the hook element 104 from the loop 124.

FIG. 7 illustrates an alternative embodiment, wherein the hook elements are reinforced in the longitudinal direction. In this embodiment, air pressurization of the hook element to cause the shape change is optional. Preferably, one or more small diameter rigid rods 130 are inserted into the hollow region of the hook element 104, wherein one end of the rod 130 is coupled to the plunger 110. The length of the rod 130 is dimensioned to allow the hook element 104 to have a hook-like shape. In other words, the distal end of the hook element 104 is free from the rod 130 when the hook element 104 has its hook-like shape. Springs 132 are coupled to the plunger 110 and the support 102. In the unactivated position, the springs are preferably unloaded and thus extended. Upon movement of the base toward the top under an applied load, the springs are compressed and the rods are pushed up into the curved tip portions of the hooks in this manner straightening these tip portions. This straightening of the tips of the hooks will cause them to be disengaged from the loops. Release of the load applied to the plunger will cause the springs to expand to their unloaded geometry, which action will withdraw the rods from the tips of the hooks which in turn will result in the hooks assuming their original hook-shaped geometry.

The movement of the plunger 110 within the containment vessel 108 can be effected through numerous direct and remote means including, but not limited to, movement of a solenoid, flexing of a diaphragm, direct loading of the plunger such as by an operator's finger, fabricating the springs from a shape memory material effective to exert a load upon receipt of an activation signal, and the like.

Alternatively, the diaphragm may be made of a shape memory material responsive to applied heat for pressurizing and depressurizing the vessel and hook elements.

The disclosure is further illustrated by the following non-limiting examples.

EXAMPLES

In this Example, a hook portion was fabricated from a nickel titanium (NiTi) shape memory alloy. A 200 μm thick NiTi shape memory alloy wire with a austenite finish transition temperature of 70° C. was woven into a metallic mesh (approximately 1 millimeter mesh spacing) and around a metallic rod mandrel of radius 1.25 millimeter (mm). The rod was removed and the shape memory alloy wire loops were fixed to the back of the mesh using an epoxy. After the epoxy was cured, the loops were cut near the base of one side of each loop to form an array of hook elements. A 15 to 20 watt heating element was affixed to the back of the metal mesh. The hook portion was pressed in face-to-face engagement with a loop portion consisting of a Velcro® loop material commercially available from the Velcro Corporation, resulting in a mechanical engagement resistant to shear and pull off forces, and weak in peel forces. Upon heating, the array of hook elements straightened significantly reducing the shear and pull off forces.

Advantageously, the releasable fastener systems are extremely versatile and can be used in a number of different applications. For example, the releasable fastener can be employed to releasably attach two automotive structural elements together to provide a mechanism that delivers different load paths in the event of an impact sufficient to activate the release mechanism. Welded and adhesively bonded "rigid" joints provide fixed load paths. The use of the remote release mechanism can be used to alter the load path. Other examples include providing a mechanism for opening and closing apparatus such as trunks, doors, glove box, and the like. The releasable fastener system may also be employed for releasable on-demand attachment mechanisms such as for releasable attachment for batteries, fuels cells, cargo containers, vehicle interior and exterior components, and the like. Moreover, the releasable fastener systems can be configured such that an energy source is not required to maintain engagement of the joint. Energy, i.e., activation signal, can be used to provide separation, thereby minimizing the impact on energy sources during use of the releasable fastener system.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A releasable fastener system comprising:
   a loop portion comprising a support and a loop material disposed on a surface thereon;
   a hook portion comprising a support and a plurality of hook elements disposed on a surface, wherein the plurality of hook elements comprises a material or configuration adapted to change a shape orientation, a flexural modulus property, or a combination thereof, upon receipt of an activation signal, and wherein the plurality of hook elements comprise hollow tubes, wherein each hollow tube comprises a closed end and an open end; and
   an activation device coupled to the plurality of hook elements, the activation device being operable to selectively provide the activation signal to the hook elements and change the shape orientation, the flexural modulus property, or a combination of the shape orientation and flexural modulus properties to reduce a shear force and/or a pull-off force.

2. The releasable fastener system of claim 1, wherein the activation signal comprises a pneumatic signal, a mechanically activating signal, or combinations comprising at least one of the foregoing signals.

3. The releasable fastener system of claim 1, wherein the loop material comprises a shape adapted to be engaged with the hook elements when the hook portion is pressed into face-to-face engagement with the loop portion.

4. The releasable fastener system of claim 1, wherein the activation device comprises an activation signal effective to provide a shape change, change in flexural modulus properties, or a combination thereof to the hook elements.

5. The releasable fastener system of claim 1, further comprising coupling the activation device to the loop material, wherein the loop material comprises a material adapted to change a shape orientation, a flexural modulus property, or a combination thereof, upon receipt of an activation signal from the activation device.

6. The releasable fastener system of claim 1, wherein the activation signal pneumatically introduces air into the open end to change the shape orientation of the plurality of hook elements.

7. The releasable fastener system of claim 1, wherein the shape orientation to the plurality of hook elements changes from an inverted J-shaped orientation to a substantially straightened shape orientation.

8. The releasable fastener system of claim 1, wherein the plurality of hook elements are fabricated from shape memory alloys, shape memory polymers, piezoelectrics, magnetostrictive materials, ionic polymer metal composites, elastic memory composites, electroactive polymers, and ionic polymer metal composites, or combinations comprising at least one of the foregoing materials.

9. The releasable fastener system of claim 8, wherein the shape memory alloy comprises nickel titanium.

10. The process according to claim 9, wherein the shape memory alloy comprises nickel titanium.

11. A process for operating a releasable fastener system, the process comprising:
    contacting a loop portion to a hook portion to form a releasable engagement, wherein the loop portion comprises a support and a loop material disposed on a surface thereon, and wherein the hook portion comprises a support and a plurality of hook elements disposed on a surface, wherein the plurality of hook elements comprises a material or a configuration adapted to change a shape orientation, a flexural modulus property, or a combination thereof, upon receipt of an energy signal, wherein the material or the configuration comprises comprise hollow tubes, wherein each hollow tube comprises a closed end and an open end;
    maintaining constant shear and pull-off forces in the releasable engagement without introducing an energy signal;

selectively introducing the energy signal to the hook elements, wherein the energy signal is effective to change a shape orientation, a flexural modulus property, or the combination thereof to the plurality of hook elements; and reducing shear and/or pull off forces in the releasable engagement.

12. The process according to claim 11, wherein the energy signal comprises apneuinatic signal, a mechanically activating signal, or combinations comprising at least one of the foregoing signals.

13. The process according to claim 11, wherein the plurality of hook elements are fabricated from shape memory alloys, shape memory polymers, piezoelectrics, magnetostrictive materials, ionic polymer metal composites, elastic memory composites, electroactive polymers, and ionic polymer metal composites, or combinations comprising at least one of the foregoing materials.

14. A hook portion for a releasable fastener system comprising:
  a support; and
  a plurality of hook elements disposed on a surface of the support, wherein the plurality of hook elements comprise a material or configuration adapted to change a shape orientation, a flexural modulus property, or a combination thereof, upon receipt of an activation signal, wherein the plurality of hook elements are fabricated from shape memory alloys, piezoelectrics, magnetostrictive materials, elastic memory composites, electroactive polymers, and ionic polymer metal composites, or combinations comprising at least one of the foregoing materials, and wherein the support comprises a plurality of perforations disposed with a surface of the support, and wherein each one of the plurality of hook elements comprises a hollow tube comprising a closed end and an open end, wherein the open end is in fluid communication with the perforation.

15. The hook portion according to claim 14, wherein the support comprises a metal, a plastic, a fabric, or a combination comprising at least one of the foregoing materials.

16. The hook portion according to claim 14, further comprising an activation device adapted to provide the activation signal to the plurality of hook elements.

* * * * *